United States Patent
Su et al.

(10) Patent No.: US 11,481,050 B1
(45) Date of Patent: Oct. 25, 2022

(54) FUNCTION PARAMETER SWITCHING MEMORY CIRCUIT FOR PERIPHERAL DEVICE AND OPERATING METHOD THEREOF

(71) Applicant: Primax Electronics Ltd., Taipei (TW)

(72) Inventors: Chun-Nan Su, Taipei (TW); Jian-Bin Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/534,300

(22) Filed: Nov. 23, 2021

(30) Foreign Application Priority Data

Jul. 30, 2021 (CN) .......................... 202110870044.X

(51) Int. Cl.
- *G06F 3/038* (2013.01)
- *G06F 3/02* (2006.01)
- *G06F 3/03* (2006.01)
- *G06F 3/0354* (2013.01)

(52) U.S. Cl.
CPC .............. *G06F 3/0383* (2013.01); *G06F 3/02* (2013.01); *G06F 3/0304* (2013.01); *G06F 3/03543* (2013.01)

(58) Field of Classification Search
CPC ........................... G06F 3/03543; G06F 3/0304
See application file for complete search history.

(56) References Cited

U.S. PATENT DOCUMENTS

| | | | | |
|---|---|---|---|---|
| 6,220,963 B1* | 4/2001 | Meredith | ............ | G06F 3/03543 463/2 |
| 8,614,676 B2* | 12/2013 | Chiang | .................... | G06F 3/015 455/414.4 |
| 9,317,108 B2* | 4/2016 | Touma | ..................... | G06F 3/014 |
| 2006/0197753 A1* | 9/2006 | Hotelling | ................ | G06F 1/169 345/173 |
| 2007/0109265 A1* | 5/2007 | Shih | ....................... | G06F 3/0383 345/163 |
| 2008/0088602 A1* | 4/2008 | Hotelling | ............ | G06F 3/04883 345/173 |
| 2015/0035757 A1* | 2/2015 | Mahlmeister | ......... | A63F 13/213 345/173 |
| 2015/0293592 A1* | 10/2015 | Cheong | ................... | G06F 1/163 345/173 |
| 2018/0088684 A1* | 3/2018 | Dillon | ................... | G06F 3/0383 |

* cited by examiner

*Primary Examiner* — Chun-Nan Lin
(74) *Attorney, Agent, or Firm* — Kirton McConkie; Evan R. Witt

(57) ABSTRACT

A function parameter switching memory circuit for a peripheral device is provided. The peripheral device includes a function parameter switching memory circuit, a power management device and an optical sensor. The function parameter switching memory circuit includes a function parameter switching key and a simulation control circuit. The function parameter switching key generates and outputs a physical switch signal in response to a switching trigger action of a user. The simulation control circuit generates a virtual switch signal to the optical sensor. The simulation control circuit analyzes the physical switch signal to memorize a switched-and-set function parameter storage value. The simulation control circuit generates the virtual switch signal according to one of the physical switch signal and the switched-and-set function parameter storage value. The optical sensor performs a function parameter switching process according to the virtual switch signal.

16 Claims, 8 Drawing Sheets

US 11,481,050 B1

FUNCTION PARAMETER SWITCHING MEMORY CIRCUIT FOR PERIPHERAL DEVICE AND OPERATING METHOD THEREOF

FIELD OF THE INVENTION

The present invention relates to a function parameter switching memory circuit and an operating method thereof, and more particularly to a function parameter switching memory circuit for a peripheral device and an operating method thereof.

BACKGROUND OF THE INVENTION

Generally, a personal computer or a notebook computer is equipped with various peripheral devices such as input devices. For example, a mouse device is one of the common input devices. For complying with different operating environments or meeting different operating requirements during the operations, the mouse device is usually equipped with a design of allowing the user to switch various function parameters. For example, in some kinds of mouse devices, the dots per linear inch (DPI) value that represents the mouse resolution can be adjusted by the user. Consequently, the user can select the desired sensitivity of operating the mouse device.

For example, in the field of designing mouse devices, a commercially available optical sensor with the product number PAW3519 is provided with a function of allowing the user to self-switch the DPI value of the mouse device.

FIG. 1A is a schematic perspective view illustrating a conventional mouse device with a DPI switching function. FIG. 1B is a schematic circuit block diagram illustrating associated components of the mouse device of FIG. 1A for executing the DPI switching function.

As shown in FIGS. 1A and 1B, the mouse device 10 comprises a DPI switching key 11. When the DPI switching key 11 is manually triggered by the user, the DPI switching key 11 correspondingly generates a physical switch signal I11. The physical switch signal I11 is transmitted to the optical sensor 13 to notify the optical sensor 13 of performing a DPI switching process.

However, the conventional technology still has some drawbacks. For example, the optical sensor 13 with the function of allowing the user to self-switch the DPI value of the mouse device is implemented with a SoC type chip (e.g., the PAW3519 optical sensor chip). Consequently, the internal programs of the optical sensor 13 cannot be modified, and the optical sensor 13 cannot be connected with an external memory. In case that a power management device 12 is suffered from power interruption, the optical sensor 13 cannot memorize the DPI value that is switched-and-set by the user (i.e., the physical switch signal I11). Consequently, when the power management device 12 is started again, the internal default DPI value P of the optical sensor 13 is used again In other words, the use of the conventional moue device is not convenient to the user.

Moreover, during the process of transmitting the physical switch signal I11 to the optical sensor 13, if the optical sensor 13 is not ready to receive the data signals, some problems occur. For example, if the power management device 12 is started or restarted after power interruption and the optical sensor 13 is in a reset state, the physical switch signal I11 is possibly unable to be successfully received. Under this circumstance, the DPI value that is switched and set by the user (i.e., the physical switch signal I11) and the real DPI value of the optical sensor 13 during operation are inconsistent.

Moreover, according to the voltage level of an I/O pin of the optical sensor electrically connected with the DPI switching key 11, the optical sensor 13 recognizes that the DPI value is switched to a specified value. If the I/O pin is interfered by the external noise, the voltage level at the I/O pin is suffered from an unexpected voltage change. Moreover, if the amount of the voltage change reaches an unexpected DPI switching threshold that is set in the optical sensor 13, the optical sensor 13 may accidentally activate an internal DPI switching process. Consequently, a malfunction of the DPI switching process is possibly generated.

As mentioned above, the conventional technologies have many drawbacks. For example, the DPI value cannot be memorized, the DPI value that is switched and set by the user cannot be stored, the DPI value that is switched and set by the user and the real DPI value of the optical sensor are possibly inconsistent, or the DPI switching process is accidentally activated. For solving the above drawbacks of the conventional technologies, the present invention provides a function parameter (e.g., DPI) switching memory circuit and an operating method by using the structure of the existing optical sensor.

SUMMARY OF THE INVENTION

An object of the present invention provides a function parameter switching memory circuit and an operating method. Even if the structure of the existing optical sensor is used, the function parameter of the optical sensor during operation can be continuously maintained at the function parameter that is switched and set by the user.

In accordance with an aspect of the present invention, a function parameter switching memory circuit for a peripheral device is provided. The peripheral device includes an optical sensor. The function parameter switching memory circuit includes a function parameter switching key and a simulation control circuit. The function parameter switching key generates and outputs a physical switch signal in response to a switching trigger action of a user. The simulation control circuit includes an external controller and a virtual switch signal generator. The external controller is electrically connected with the function parameter switching key. The external controller generates and outputs a control command according to the physical switch signal. The external controller analyzes the physical switch signal to memorize a switched-and-set function parameter storage value. The virtual switch signal generator is electrically connected between the external controller and the optical sensor. The virtual switch signal generator generates and outputs a virtual switch signal to the optical sensor according to the control command. The external controller generates and outputs the control command to the virtual switch signal generator according to one of the physical switch signal and the switched-and-set function parameter storage value. The optical sensor performs a function parameter switching process according to the virtual switch signal.

In an embodiment, the function parameter switching key is a dots per linear inch (DPI) switching key or a polling rate switching key.

In an embodiment, the external controller is a microprocessor that is independently located outside the optical sensor.

In an embodiment, the microprocessor comprises an internal memory, or the microprocessor is electrically connected with an external memory. The switched-and-set function parameter storage value is stored in one of the internal memory and the external memory.

In an embodiment, if the physical switch signal is an abnormal physical switch signal, the external controller performs a switch signal filtering process to filter off the abnormal physical switch signal.

In an embodiment, the peripheral device further includes a power management device, and the power management device is electrically connected with the optical sensor and served as a power source. The power management device is further electrically connected with the external controller, or the power management device is further electrically connected with the external controller and the virtual switch signal generator.

In an embodiment, when the power management device is in a normal power state, the external controller generates and outputs the control command to the virtual switch signal generator according to the received physical switch signal. Consequently, the optical sensor performs the function parameter switching process.

In an embodiment, while the power management device is started or restarted after power interruption and the optical sensor is in a reset state, the external controller generates and outputs the control command to the virtual switch signal generator according to the memorized the switched-and-set function parameter storage value. Consequently, the optical sensor performs the function parameter switching process.

In an embodiment, the optical sensor issues a feedback monitoring signal to the external controller, and the external controller determines a content of the control command and a timing of generating and outputting the control command according to the feedback monitoring signal.

In an embodiment, the feedback monitoring signal is a real function parameter of the optical sensor during operation and/or a function parameter switching notification interrupt signal of the optical sensor. If the external controller performs a monitoring and comparing process and judges that the real function parameter and the switched-and-set function parameter storage value are different, the external controller regenerates and outputs the control command to the virtual switch signal generator according to the switched-and-set function parameter storage value. Consequently, the optical sensor performs a function parameter calibration process.

In an embodiment, the feedback monitoring signal is a ready signal of the optical sensor. When the external controller receives the ready signal, the external controller generates and outputs the control command to the virtual switch signal generator according to one of the physical switch signal and the switched-and-set function parameter storage value. Consequently, the optical sensor performs the function parameter switching process.

In an embodiment, after the optical sensor is reset, the optical sensor generates and outputs the ready signal to the external controller.

In an embodiment, if the external controller fails to receive the physical switch signal for a specified time period, the simulation control circuit is switched from a working mode to a low power consumption mode or a sleep mode.

In an embodiment, when the simulation control circuit is in the low power consumption mode or the sleep mode, if the external controller receives the physical switch signal or the external controller performs a monitoring and comparing process and judges that a real function parameter of the optical sensor during operation and the switched-and-set function parameter storage value are different, the simulation control circuit is restored to the working mode.

In an embodiment, the function parameter switching key is a key-type physical switch element or a touch-type switch element.

In an embodiment, the peripheral device is a peripheral input device, and the peripheral input device includes a mouse device.

In accordance with another aspect of the present invention, a peripheral device is provided. The peripheral device includes a function parameter switching key, an optical sensor and a simulation control circuit. The function parameter switching key generates and outputs a physical switch signal in response to a switching trigger action of a user. The optical sensor is permitted to perform a function parameter switching process. The simulation control circuit is electrically connected between the function parameter switching key and the optical sensor. The simulation control circuit generates and outputs a virtual switch signal to the optical sensor according to the physical switch signal. The simulation control circuit analyzes the physical switch signal to memorize a switched-and-set function parameter storage value. The simulation control circuit generates and outputs the virtual switch signal according to one of the physical switch signal and the switched-and-set function parameter storage value. The optical sensor performs a function parameter switching process according to the virtual switch signal.

In an embodiment, the function parameter switching key is a dots per linear inch (DPI) switching key or a polling rate switching key.

In an embodiment, the function parameter switching key is a key-type physical switch element or a touch-type switch element.

In an embodiment, the simulation control circuit is independently located outside the optical sensor, and a function parameter switching memory circuit is defined by the simulation control circuit and the function parameter switching key collaboratively. The simulation control circuit at least includes an external controller and a virtual switch signal generator. The external controller is electrically connected with the function parameter switching key. The external controller generates and outputs a control command according to the physical switch signal. The external controller analyzes the physical switch signal to memorize the switched-and-set function parameter storage value. The virtual switch signal generator is electrically connected between the external controller and the optical sensor. The virtual switch signal generator generates and outputs the virtual switch signal to the optical sensor according to the control command.

In an embodiment, the external controller includes an internal memory, or the external controller is electrically connected with an external memory. The switched-and-set function parameter storage value is stored in one of the internal memory and the external memory.

In an embodiment, the peripheral device further includes a power management device, and the power management device is electrically connected with the optical sensor and served as a power source. The power management device is further electrically connected with the external controller, or the power management device is further electrically connected with the external controller and the virtual switch signal generator.

In an embodiment, when the power management device is in a normal power state, the external controller generates and outputs the control command to the virtual switch signal generator according to the received physical switch signal. Consequently, the optical sensor performs the function parameter switching process.

In an embodiment, while the power management device is started or restarted after power interruption and the optical sensor is in a reset state, the external controller generates and outputs the control command to the virtual switch signal generator according to the memorized the switched-and-set function parameter storage value. Consequently, the optical sensor performs the function parameter switching process.

In an embodiment, the optical sensor issues a feedback monitoring signal to the simulation control circuit, and the simulation control circuit determines a content of the control command and a timing of generating and outputting the virtual switch signal according to the feedback monitoring signal. The feedback monitoring signal is a real function parameter of the optical sensor during operation, a function parameter switching notification interrupt signal of the optical sensor or a ready signal of the optical sensor.

In an embodiment, if the simulation control circuit fails to receive the physical switch signal for a specified time period, the simulation control circuit is switched from a working mode to a low power consumption mode or a sleep mode. When the simulation control circuit is in the low power consumption mode or the sleep mode, if the simulation control circuit receives the physical switch signal or the simulation control circuit performs a monitoring and comparing process and judges that a real function parameter of the optical sensor during operation and the switched-and-set function parameter storage value are different, the simulation control circuit is restored to the working mode.

In accordance with another aspect of the present invention, a function parameter switching memory operating method for a peripheral device is provided. The peripheral device at least includes a function parameter switching key, an optical sensor, a simulation control circuit and a power management device. The function parameter switching memory operating method at least includes the following steps. In a step (a), while the power management device is started or restarted after power interruption and the optical sensor is in a reset state, the simulation control circuit judges whether a switched-and-set function parameter storage value has been stored in the simulation control circuit. In a step (b), if the simulation control circuit judges that the switched-and-set function parameter storage value has been stored in the simulation control circuit, the simulation control circuit generates a virtual switch signal according to the switched-and-set function parameter storage value. Consequently, the optical sensor performs a function parameter switching process. In a step (c), if the simulation control circuit judges that the switched-and-set function parameter storage value is not stored in the simulation control circuit, the simulation control circuit judges whether a physical switch signal generated and outputted from the function parameter switching key in response to a switching trigger action of a user is received within a specified time period. In a step (d), if the simulation control circuit judging that the physical switch signal is received within the specified time period, the simulation control circuit generates the virtual switch signal according to the physical switch signal. Consequently, the optical sensor performs the function parameter switching process. In a step (e), if the simulation control circuit judges that the physical switch signal is not received within the specified time period, an operation mode of the simulation control circuit is switched from a working mode to a low power consumption mode or a sleep mode. In a step (f), when the simulation control circuit is in the low power consumption mode or the sleep mode, the simulation control circuit judges whether the physical switch signal is received, or the simulation control circuit perform a monitoring and comparing process and judges whether a real function parameter of the optical sensor during operation and the switched-and-set function parameter storage value are identical. In a step (g), if the simulation control circuit judges that the physical switch signal is received or the simulation control circuit judges that the real function parameter of the optical sensor and the switched-and-set function parameter storage value are different, the operation mode of the simulation control circuit is restored to the working mode.

In the step (b) or the step (d), before or after the optical sensor performs the function parameter switching process, the function parameter switching memory operating method further includes a step (h) of allowing the optical sensor to issue a feedback monitoring signal to the simulation control circuit. Consequently, the simulation control circuit determines a content of the control command and a timing of generating and outputting the virtual switch signal according to the feedback monitoring signal. The feedback monitoring signal is the real function parameter of the optical sensor during operation, or the feedback monitoring signal is a ready signal of the optical sensor, or the feedback monitoring signal is a function parameter switching notification interrupt signal.

In an embodiment, the feedback monitoring signal is the ready signal of the optical sensor, and the simulation control circuit waits for receiving the ready signal before the optical sensor performs the function parameter switching process. When the simulation control circuit receives the ready signal, the optical sensor performs the function parameter switching process according to one of the physical switch signal and the switched-and-set function parameter storage value.

In an embodiment, the feedback monitoring signal is the real function parameter of the optical sensor during operation and/or the function parameter switching notification interrupt signal of the optical sensor. After the optical sensor performs the function parameter switching process, if the simulation control circuit performs a monitoring and comparing process and judges that the real function parameter and the switched-and-set function parameter storage value are different, the simulation control circuit regenerates and outputs the virtual switch signal according to the switched-and-set function parameter storage value. Consequently, the optical sensor performs a function parameter calibration process.

The above objects and advantages of the present invention will become more readily apparent to those ordinarily skilled in the art after reviewing the following detailed description and accompanying drawings, in which:

Figure 1A:
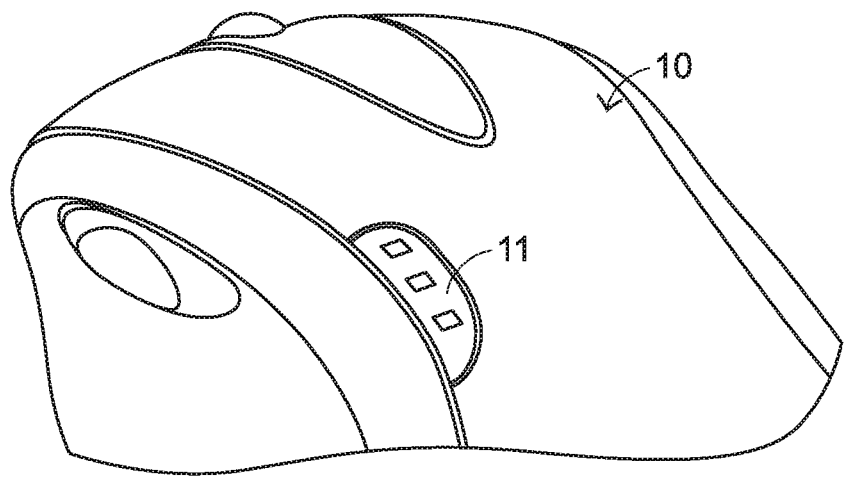
FIG. 1A is a schematic perspective view illustrating a conventional mouse device with a DPI switching function.
Figure 1B:
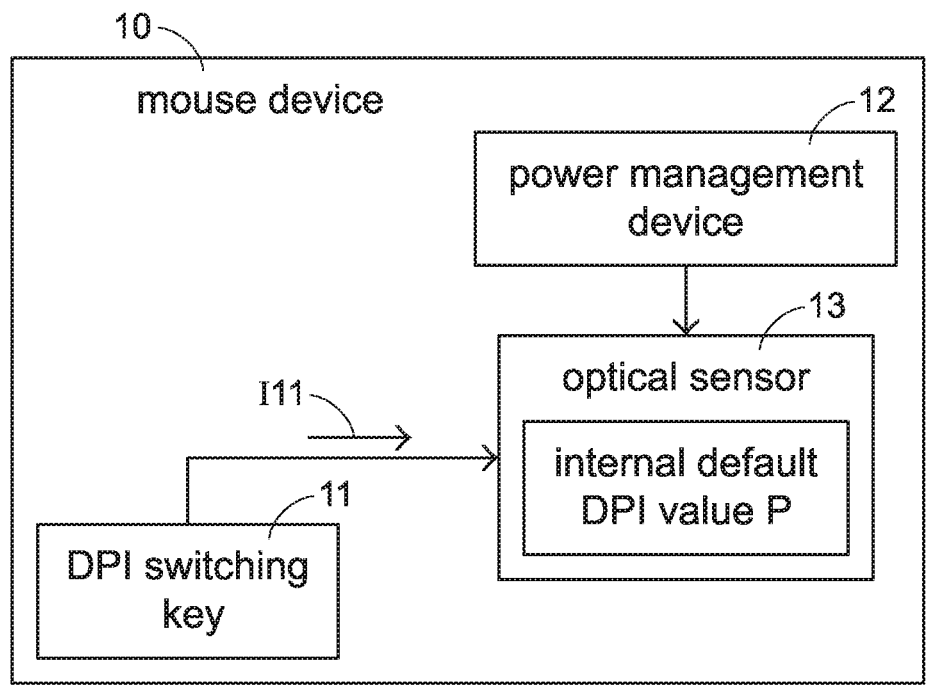
FIG. 1B is a schematic circuit block diagram illustrating associated components of the mouse device of FIG. 1A for executing the DPI switching function.
Figure 2:
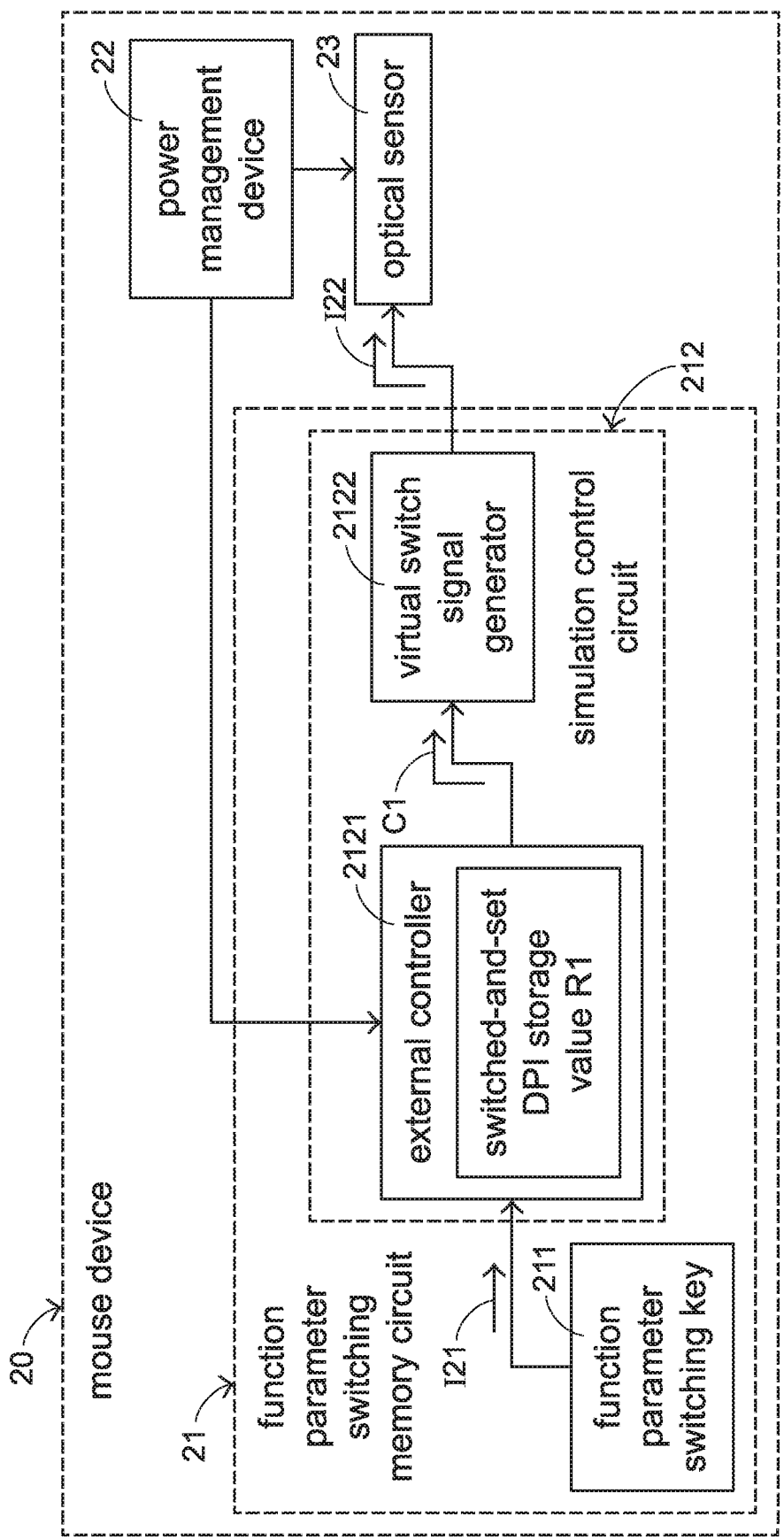
FIG. 2 is a schematic circuit block diagram illustrating the concept of a peripheral input device (e.g., a mouse device) with a function parameter switching memory circuit according to a first embodiment of the present invention.
Figure 3:
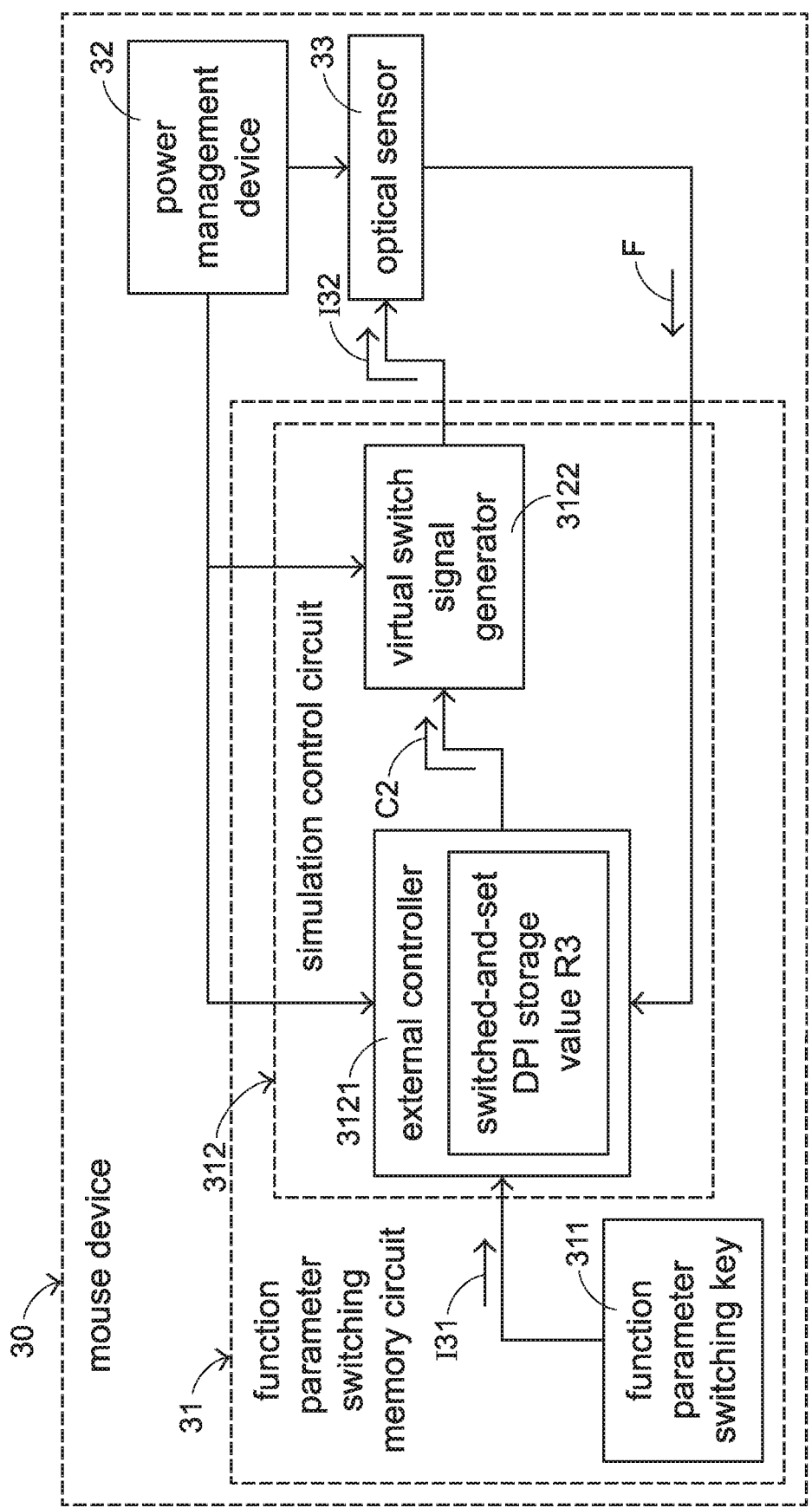
FIG. 3 is a schematic circuit block diagram illustrating the concept of a peripheral input device (e.g., a mouse device)
Figure 4A:
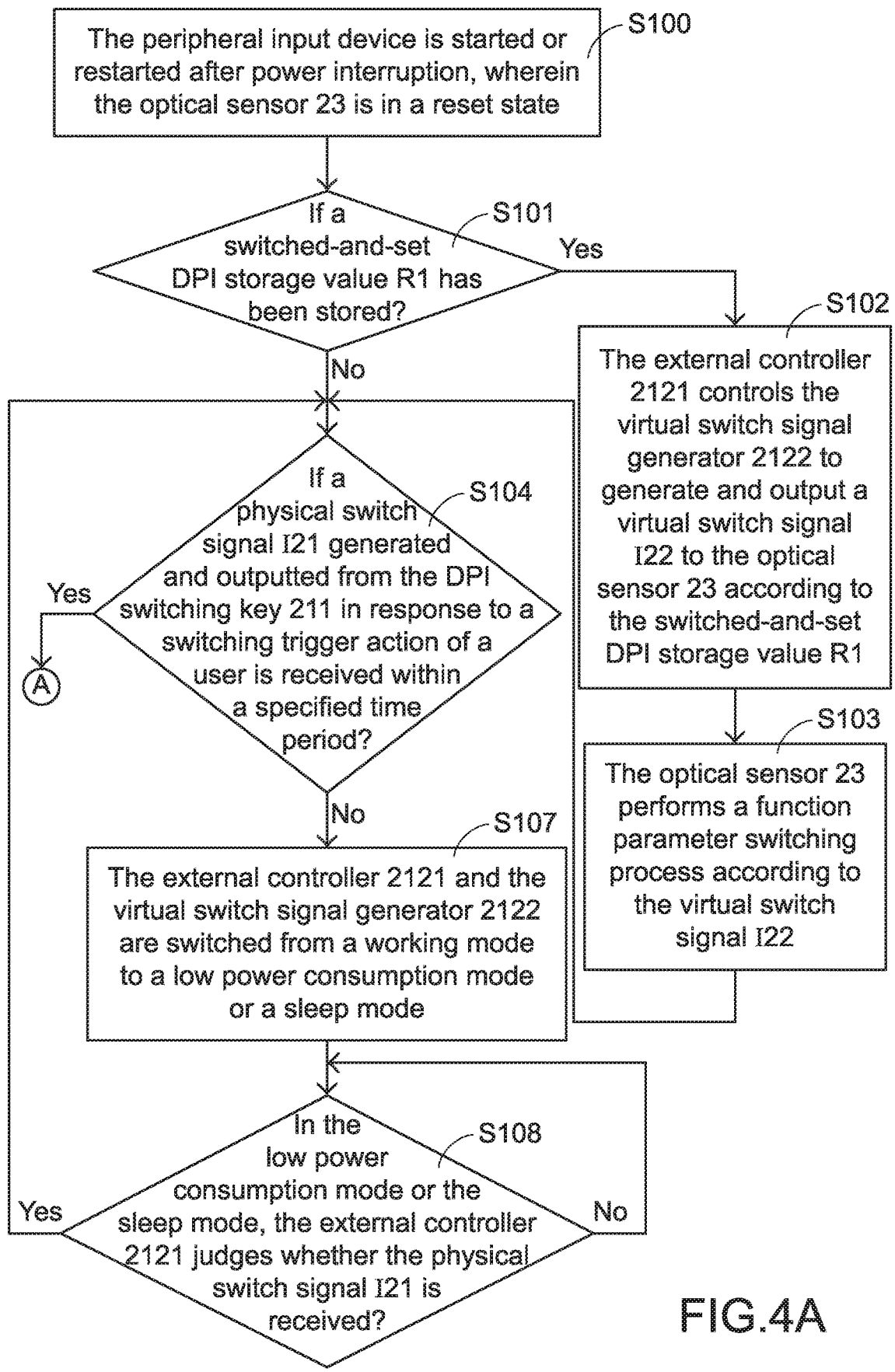
Figure 4B:
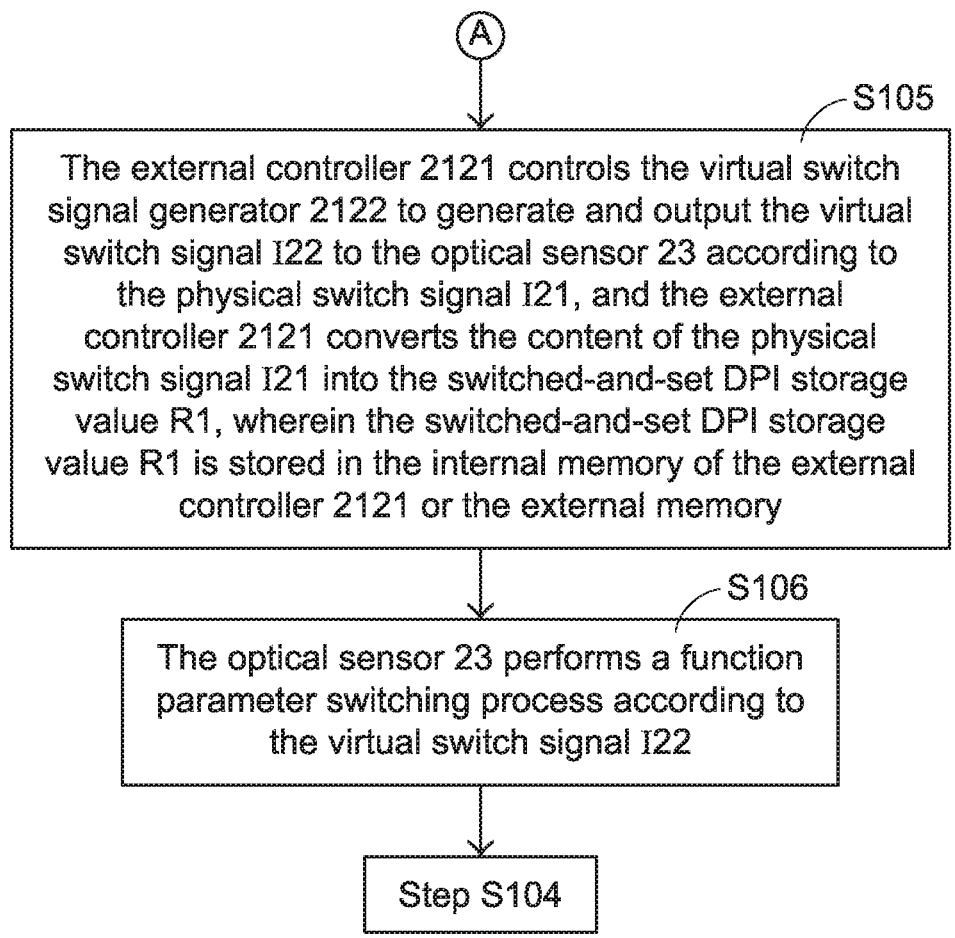
Figure 5A:
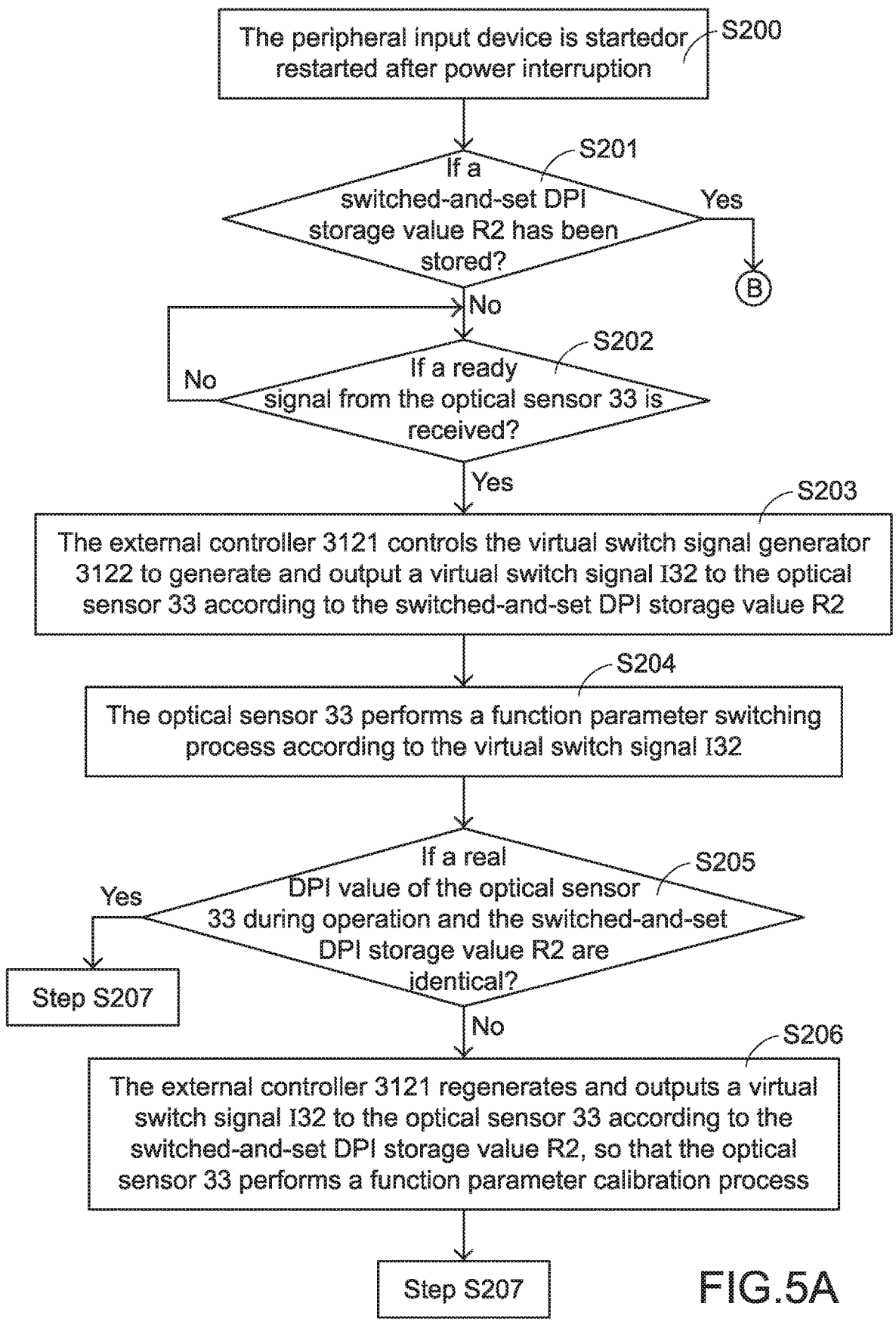
Figure 5B:
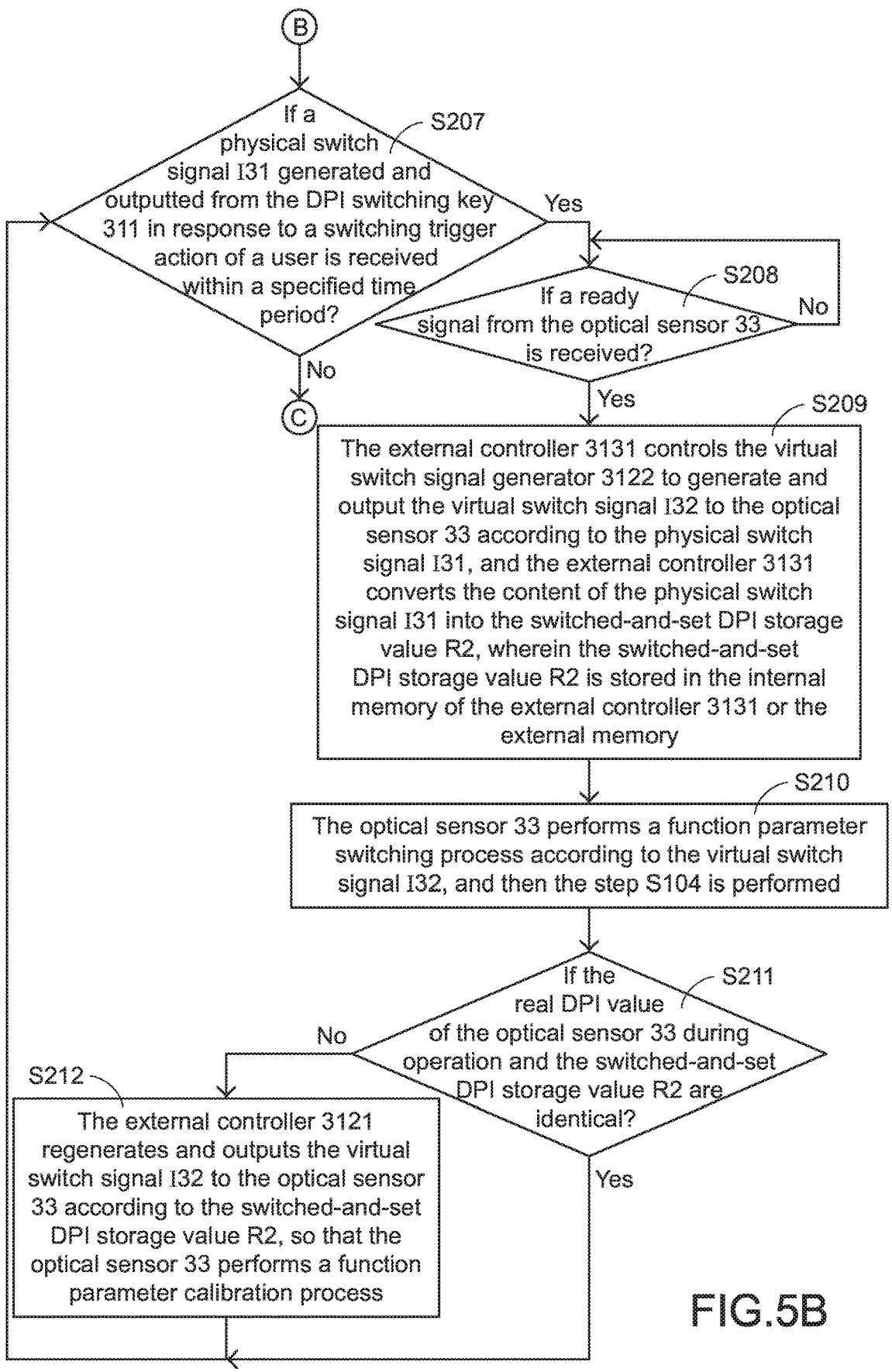
Figure 5C:
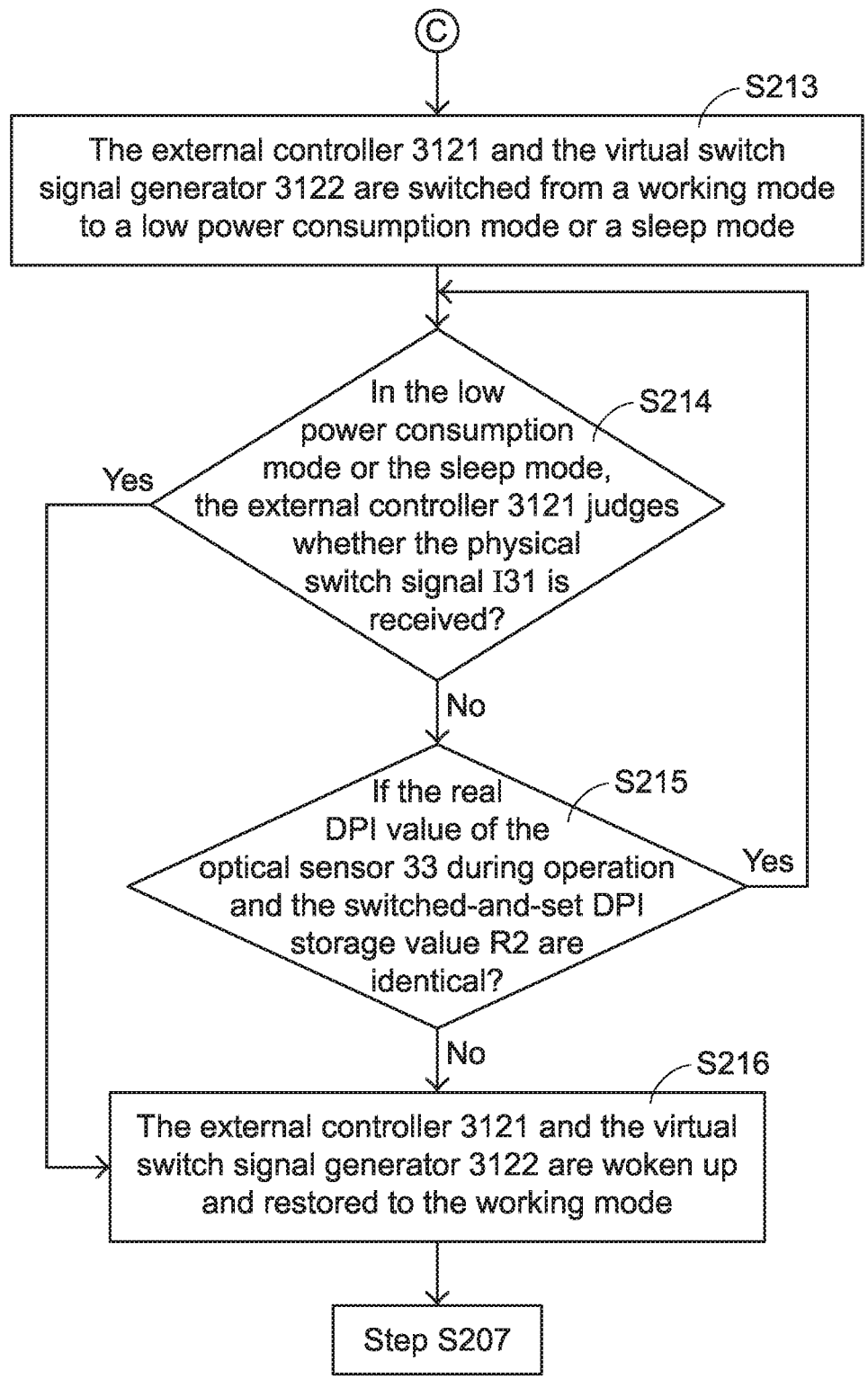

with a function parameter switching memory circuit according to a second embodiment of the present invention;

FIGS. 4A and 4B schematically illustrate a function parameter switching memory operating method for the peripheral input device as shown in FIG. 2 according to a first embodiment of the present invention; and FIGS. 5A, 5B and 5C schematically illustrate a function parameter switching memory operating method for the peripheral input device as shown in FIG. 3 according to a second embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

FIG. 2 is a schematic circuit block diagram illustrating the concept of a peripheral input device (e.g., a mouse device) with a function parameter switching memory circuit according to a first embodiment of the present invention. As shown in FIG. 2, the mouse device 20 comprises a function parameter switching memory circuit 21, a power management device 22 and an optical sensor 23. The function parameter switching memory circuit 21 at least comprises a function parameter switching key 211 and a simulation control circuit 212. The simulation control circuit 212 at least comprises an external controller 2121 and a virtual switch signal generator 2122.

In this embodiment and the following embodiments, the dots per linear inch (DPI) value of the mouse device is taken as an example of the function parameter. Consequently, the function parameter switching memory circuit 21 is a DPI switching memory circuit 21, and the function parameter switching key 211 is a DPI switching key 211. The DPI switching memory circuit 21 and the DPI switching key 211 are illustrated herein for facilitating the user to understand the concepts of the present invention. It is noted that the applications of the present invention are not restricted.

The DPI switching memory circuit 21 of the present invention can be applied to the commercially available optical sensor that is provided with a function of allowing the user to self-switch the DPI value of the mouse device. For example, the commercially available optical sensor is the optical sensor with the product number PAW3519. It is noted that the optical sensor used with the DPI switching memory circuit 21 is not restricted to the PAW3519 optical sensor.

The concepts of the technologies of the present invention can be expanded to other function parameters (or operation modes). For example, the technologies of the present invention can be provided with a function of allowing the user to self-switch a polling rate. That is, the technologies of the present invention are not restricted to a specified function parameter.

The operating principles of the mouse device as shown in FIG. 2 will be described as follows. As shown in FIG. 2, the DPI switching memory circuit 21 is electrically connected with and cooperatively operated with the optical sensor 23. For example, the optical sensor 23 is a commercially available optical sensor with the product number PAW3519. The simulation control circuit 212 comprises the external controller 2121 and the virtual switch signal generator 2122. A physical switch signal I21 can be inputted into the external controller 2121. The virtual switch signal generator 2122 is electrically connected between the external controller 2121 and the optical sensor 23. According to a control command C1 from the external controller 2121, the virtual switch signal generator 2122 generates a virtual switch signal 122 corresponding to the physical switch signal I21 through simulation and issues the virtual switch signal 122 to the optical sensor 23. According to the virtual switch signal 122, the optical sensor 23 performs a function parameter switching process related to the DPI adjustment.

In an embodiment, the external controller 2121 is a microprocessor that is independently located outside the optical sensor 23. In response to a switching trigger action of a user, the DPI switching key 211 generates and outputs the physical switch signal I21. After the external controller 2121 receives the physical switch signal I21, the external controller 2121 determines the virtual switch signal 122 to be outputted to the optical sensor 23 according to the content of the physical switch signal I21 (e.g., the press number of the user or the corresponding code). In addition, the external controller 2121 converts the content of the physical switch signal I21 into a switched-and-set DPI storage value R1. The switched-and-set DPI storage value R1 is stored in an internal memory of the external controller 2121.

In another embodiment, the switched-and-set DPI storage value R1 is taken as an example of a switched-and-set function parameter storage value.

In another embodiment, the switched-and-set DPI storage value R1 is stored in an external memory (not shown) that is electrically connected with the external controller 2121. The associated technologies are not redundantly described herein.

In another embodiment, the external controller 2121 can perform a switch signal filtering process in order to filter off the abnormal physical switch signal I21.

In an embodiment, the DPI switching key 211 is a key-type physical switch element. It is noted the example of the DPI switching key 211 is not restricted. That is, the example of the DPI switching key 211 may be varied according to the practical requirements. For example, in another embodiment, the DPI switching key is a touch-type switch element.

For example, the power management device 22 is a battery power device or a USB wired power device. When the power management device 22 is in a normal working state, the power management device 22 provides electricity for normally powering the mouse device 20. Moreover, the power management device 22 is electrically connected with the external controller 2121 and the optical sensor 23 to provide identical or different working voltages/currents to the external controller 2121 and the optical sensor 23.

Moreover, while the power management device 22 of the mouse device 20 is started or restarted after power interruption and the optical sensor 23 is in a reset state, the switched-and-set DPI storage value R1 that has been memorized and stored in of the external controller 2121 is converted into the virtual switch signal 122 by the external controller 2121, and the virtual switch signal 122 is transmitted to the optical sensor 23. Consequently, the optical sensor 23 can be continuously operated according to the DPI value that has been switched and set by the user before the mouse device 20 is restarted or powered off. In this way, the drawbacks of the conventional technologies can be overcome.

In an embodiment, if the external controller 2121 fails to receive the physical switch signal I21 for a specified time period, the simulation control circuit 212 (including the external controller 2121 and the virtual switch signal generator 2122) is switched from a working mode to a low power consumption mode or a sleep mode.

Whereas, if the external controller 2121 receives the physical switch signal I21 within the specified time period or the external controller 2121 performs a monitoring and comparing process and judges that the real function parameter of the optical sensor 23 and the switched-and-set DPI storage value R1 are different, the simulation control circuit 212 is restored to the working mode.

FIG. 3 is a schematic circuit block diagram illustrating the concept of a peripheral input device (e.g., a mouse device) with a function parameter switching memory circuit according to a second embodiment of the present invention. In this embodiment, the dots per linear inch (DPI) value of the mouse device is taken as an example of the function parameter. As shown in FIG. 3, the mouse device 30 comprises a function parameter switching memory circuit 31, a power management device 32 and an optical sensor 33. The function parameter switching memory circuit 31 at least comprises a function parameter switching key 311 and a simulation control circuit 312. The simulation control circuit 312 at least comprises an external controller 3121 and a virtual switch signal generator 3122. As mentioned above, the DPI value is the example of the function parameter. Consequently, the function parameter switching memory circuit 31 is a DPI switching memory circuit 31, and the function parameter switching key 311 is a DPI switching key 311.

The components in the circuit block diagram of the second embodiment are expanded from the components in the circuit block diagram of the first embodiment. In addition, the operations of the physical switch signal I31, the control command C2 and the virtual switch signal I32 as shown in FIG. 3 are similar to the operations of the physical switch signal I21, the control command C1 and the virtual switch signal I22 in the circuit block diagram of the first embodiment, and not redundantly described herein.

For example, the power management device 32 is a battery power device or a USB wired power device. Similarly, when the power management device 32 is in a normal power state, the power management device 32 provides electricity for normally powering the mouse device 30. In comparison with the first embodiment, the operations of the power management device 32 in the circuit block diagram of the second embodiment are distinguished. In case that the virtual switch signal generator 3122 is not powered by the external controller 3121, the power management device 32 is electrically connected with the external controller 3121, the virtual switch signal generator 3122 and the optical sensor 33 to provide identical or different working voltages/currents to the external controller 3121, the virtual switch signal generator 3122 and the optical sensor 33.

In accordance with an additional feature of the second embodiment, the external controller 3121 receives a feedback monitoring signal F from the optical sensor 33 during operation at any time or at irregular time. In addition, the external controller 3121 recognizes the content of the feedback monitoring signal F or compares the feedback monitoring signal F with the internal parameters. Consequently, unexpected (accidental) errors of the optical sensor 33 during operation can be avoided, and the real DPI value and the switched-and-set DPI storage value R2 set by the user will be consistent.

In another embodiment, the switched-and-set DPI storage value R2 is taken as an example of a switched-and-set function parameter storage value.

In an embodiment, the feedback monitoring signal F contains various signal sources that can be provided to the external controller 3121 to be monitored. For example, the external controller 3121 is a real DPI value of the optical sensor 33 during operation. Consequently, the external controller 3121 can continuously monitor the real DPI value of the optical sensor 33 during operation and compare the real DPI value with the switched-and-set DPI storage value R2. Moreover, if the I/O pin electrically between the optical sensor 33 and the virtual switch signal generator 3122 is adversely affected by noise, unexpected (accidental) malfunction of the DPI switching process is possibly generated. According to the result of the above monitoring and comparing process, the external controller 3121 can recalibrate the real DPI value of the optical sensor 33. That is, the external controller 3121 can control the optical sensor 33 to perform a function parameter calibration process.

It is noted that the timing of activating the function parameter calibration process may be varied according to the practical requirements. For example, in another embodiment, the external controller 3121 activates the function parameter calibration process according to the result of the above monitoring and comparing process and in response to a function parameter switching notification interrupt signal (e.g., a DPI switching notification interrupt signal) from the optical sensor 33 at irregular time. In other words, the content of the feedback monitoring signal F contains the real DPI value of the optical sensor 33 during operation and also the DPI switching notification interrupt signal.

In another embodiment, the external controller 3121 only waits for the DPI switching notification interrupt signal that is outputted from the optical sensor 33 at irregular time. At the time when the DPI switching notification interrupt signal is received, the function parameter calibration process is activated.

As previously described in the prior art, if the optical sensor is not ready and in the reset state (e.g., the power management device is started or restarted after power interruption), the data signal is possibly unable to be successfully received. Under this circumstance, the DPI value that is switched and set by the user may be erroneous or inconsistent with the real DPI value. For solving the above drawbacks, the operating method of the present invention is modified. For example, in an embodiment, the feedback monitoring signal F is a ready signal from the optical sensor 33 during operation. Consequently, after the external controller 3121 confirms that the optical sensor 33 is ready to receive data signals, the external controller 3121 issues the virtual switch signal I32 to the optical sensor 33.

FIGS. 4A and 4B schematically illustrate a function parameter switching memory operating method for the peripheral input device as shown in FIG. 2 according to a first embodiment of the present invention. The function parameter switching memory operating method at least comprises the following steps.

In a step S100, the peripheral input device is started or restarted after power interruption. Meanwhile, the optical sensor 23 is in a reset state.

Then, a step S101 is performed to judge whether a switched-and-set DPI storage value R1 has been stored in the simulation control circuit 212. That is, the external controller 2121 checks whether the switched-and-set DPI storage value R1 has been stored in an internal memory of the external controller 2121 or in an external memory.

If the external controller 2121 judges that the switched-and-set DPI storage value R1 has not been stored (in the step S101), a step S104 is performed.

If the external controller 2121 judges that the switched-and-set DPI storage value R1 has been stored (in the step S101), a step S102 is performed. In the step S102, the external controller 2121 controls the virtual switch signal generator 2122 to generate and output a virtual switch signal 122 to the optical sensor 23 according to the switched-and-set DPI storage value R1.

After the step S102, a step S103 is performed. In the step S103, the optical sensor 23 performs a function parameter switching process according to the virtual switch signal 122, and then the step S104 is performed.

In the step S104, the external controller 2121 judges whether a physical switch signal I21 is received within a specified time period, wherein the physical switch signal I21 is generated and outputted from the DPI switching key 211 in response to a switching trigger action of a user.

If the external controller 2121 judges that the physical switch signal I21 is received within the specified time period (in the step S104), a step S105 is performed. The external controller 2121 controls the virtual switch signal generator 2122 to generate and output the virtual switch signal 122 to the optical sensor 23 according to the physical switch signal I21. In addition, the external controller 2121 converts the content of the physical switch signal I21 into the switched-and-set DPI storage value R1. The switched-and-set DPI storage value R1 is stored in the internal memory of the external controller 2121 or the external memory.

After the step S105, a step S106 is performed. In the step S106, the optical sensor 23 performs a function parameter switching process according to the virtual switch signal 122, and then the step S104 is performed.

If the external controller 2121 judges that the physical switch signal I21 is not received within the specified time period (in the step S104), a step S107 is performed. Meanwhile, the external controller 2121 and the virtual switch signal generator 2122 are switched from a working mode to a low power consumption mode or a sleep mode.

After the step S107, a step S108 is performed. In the low power consumption mode or the sleep mode, the external controller 2121 judges whether the physical switch signal I21 is received.

If the external controller 2121 judges that the physical switch signal I21 is received (in the step S108), the step S104 is repeatedly done. Whereas, if the external controller 2121 judges that the physical switch signal I21 is not received (in the step S108), the step S108 is repeatedly done.

FIGS. 5A, 5B and 5C schematically illustrate a function parameter switching memory operating method for the peripheral input device as shown in FIG. 3 according to a second embodiment of the present invention. The function parameter switching memory operating method at least comprises the following steps.

In a step S200, the peripheral input device is started or restarted after power interruption.

Then, a step S201 is performed to judge whether a switched-and-set DPI storage value R2 has been stored in the simulation control circuit 312. That is, the external controller 3121 checks whether the switched-and-set DPI storage value R2 has been stored in an internal memory of the external controller 3121 or in an external memory.

If the external controller 3121 judges that the switched-and-set DPI storage value R2 has not been stored (in the step S201), a step S207 is performed.

Whereas, if the external controller 3121 judges that the switched-and-set DPI storage value R2 has been stored (in the step S201), a step S202 is performed. In the step S202, the external controller 3121 judges whether a ready signal from the optical sensor 33 is received.

If the external controller 3121 judges that no ready signal from the optical sensor 33 is received (in the step S202), the step S202 is repeatedly done.

Whereas, if the external controller 3121 judges that the ready signal from the optical sensor 33 is received (in the step S202), a step S203 is performed. In the step S203, the external controller 3121 controls the virtual switch signal generator 3122 to generate and output a virtual switch signal I32 to the optical sensor 33 according to the switched-and-set DPI storage value R2.

After the step S203, a step S204 is performed. In the step S203, the optical sensor 33 performs a function parameter switching process according to the virtual switch signal I32.

After the step S204, a step S205 is performed. In the step S205, the external controller 3121 performs a monitoring and comparing process and judges whether a real DPI value of the optical sensor 33 during operation and the switched-and-set DPI storage value R2 are identical.

If the external controller 3121 judges that the real DPI value of the optical sensor 33 during operation and the switched-and-set DPI storage value R2 are identical (in the step S205), a step S207 is performed.

Whereas, if the external controller 3121 judges that the real DPI value of the optical sensor 33 during operation and the switched-and-set DPI storage value R2 are different (in the step S204), a step S206 is performed. In the step S206, the external controller 3121 regenerates and outputs a virtual switch signal I32 to the optical sensor 33 according to the switched-and-set DPI storage value R2. Consequently, the optical sensor 33 performs a function parameter calibration process, and then the step S207 is performed.

In the step S207, the external controller 3121 judges whether a physical switch signal I31 is received within a specified time period, wherein the physical switch signal I31 is generated and outputted from the DPI switching key 311 in response to a switching trigger action of a user.

If the external controller 3121 judges that the physical switch signal I31 is received within the specified time period (in the step S207), a step S208 is performed to judge whether a ready signal from the optical sensor 33 is received. If the external controller 3121 judges that no ready signal from the optical sensor 33 is received (in the step S208), the step S208 is repeatedly done.

If the external controller 3121 judges that the ready signal from the optical sensor 33 is received (in the step S208), a step S209 is performed. In the step S209, the external controller 3121 controls the virtual switch signal generator 3122 to generate and output the virtual switch signal I32 to the optical sensor 33 according to the physical switch signal I31. In addition, the external controller 3121 converts the content of the physical switch signal I31 into the switched-and-set DPI storage value R2. The switched-and-set DPI storage value R2 is stored in an internal memory of the external controller 3121 or the external memory.

After the step S209, a step S210 is performed. In the step S210, the optical sensor 33 performs a function parameter switching process according to the virtual switch signal I32.

After the step S210, a step S211 is performed. In the step S211, the external controller 3121 performs a monitoring and comparing process and judges whether the real DPI value of the optical sensor 33 during operation and the switched-and-set DPI storage value R2 are identical.

If the external controller 3121 judges that the real DPI value of the optical sensor 33 during operation and the switched-and-set DPI storage value R2 are identical (in the step S211), the step S207 is performed.

Whereas, if the external controller 3121 judges that the real DPI value of the optical sensor 33 during operation and the switched-and-set DPI storage value R2 are different (in the step S211), a step S212 is performed. In the step S212, the external controller 3121 regenerates and outputs the virtual switch signal I32 to the optical sensor 33 according to the switched-and-set DPI storage value R2. Consequently, the optical sensor 33 performs a function parameter calibration process, and then the step S207 is performed.

If the external controller 3121 judges that the physical switch signal I31 is not received within the specified time period (in the step S207), a step S213 is performed. Meanwhile, the external controller 3121 and the virtual switch signal generator 3122 are switched from a working mode to a low power consumption mode or a sleep mode.

After the step S213, a step S214 is performed. In the low power consumption mode or the sleep mode, the external controller 3121 judges whether the physical switch signal I31 is received.

If the external controller 3121 judges that the physical switch signal I31 is received (in the step S214), a step S216 is performed. In the step S216, the external controller 3121 and the virtual switch signal generator 3122 are woken up and restored to the working mode, and the step S207 is repeatedly done.

Whereas, if the external controller 3121 judges that the physical switch signal I31 is not received (in the step S214), a step S215 is performed. In the step S215, the external controller 3121 performs the monitoring and comparing process and judges whether the real DPI value of the optical sensor 33 during operation and the switched-and-set DPI storage value R2 are identical.

If the external controller 3121 judges that the real DPI value of the optical sensor 33 during operation and the switched-and-set DPI storage value R2 are identical (in the step S215), the step S214 is repeatedly done.

Whereas, if the external controller 3121 judges that the real DPI value of the optical sensor 33 during operation and the switched-and-set DPI storage value R2 are different (in the step S215), the step S216 is performed. In the step S216, the external controller 3121 and the virtual switch signal generator 3122 are woken up and restored to the working mode, and the step S207 is repeatedly done.

After the external controller 3121 and the virtual switch signal generator 3122 are restored to the working mode, the external controller 3121 regenerates and outputs the virtual switch signal I32 to the optical sensor 33 according to the switched-and-set DPI storage value R2, and the optical sensor 33 performs the function parameter calibration process.

In the above embodiment, the simulation control circuit 312 is woken up when the physical switch signal I31 generated by the DPI switching key 311 in response to the user's triggering action is received. Alternatively, the simulation control circuit 312 is woken up when any of the feedback monitoring signals F mentioned above is received.

In accordance with the technology of the present invention, the external controller 3121 in the low power consumption mode (i.e., the power saving mode) can continuously receive the real DPI value of the optical sensor 33 during operation. In addition, if the external controller 3121 judges that the real DPI value of the optical sensor 33 during operation and the switched-and-set DPI storage value R2 are not consistent, the external controller 3121 is woken up and restored to the normal working mode. In addition, the real DPI value of the optical sensor 33 during operation is automatically recalibrated.

In another embodiment of waking up the simulation control circuit 312, the external controller 3121 continuously waits for a DPI switching notification interrupt signal from the optical sensor 33. When the switching notification interrupt signal is received, the external controller 3121 is woken up and restored to the normal working mode. In addition, the real DPI value of the optical sensor 33 during operation is automatically recalibrated.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A function parameter switching memory circuit for a peripheral device with an optical sensor, the function parameter switching memory circuit comprising:
    a function parameter switching key, wherein the function parameter switching key generates and outputs a physical switch signal in response to a switching trigger action of a user, and
    a simulation control circuit comprising:
        an external controller and
        a virtual switch signal generator,
        wherein the external controller is electrically connected with the function parameter switching key,
        the external controller generates and outputs a control command according to the physical switch signal, and
        the external controller analyzes the physical switch signal to memorize a switched-and-set function parameter storage value,
        wherein the virtual switch signal generator is electrically connected between the external controller and the optical sensor, and
        the virtual switch signal generator generates and outputs a virtual switch signal to the optical sensor according to the control command,
    wherein the external controller generates and outputs the control command to the virtual switch signal generator according to one of the physical switch signal and the switched-and-set function parameter storage value, and
    the optical sensor performs a function parameter switching process according to the virtual switch signal.

2. The function parameter switching memory circuit according to claim 1, wherein the function parameter switching key is a dots per linear inch (DPI) switching key or a polling rate switching key.

3. The function parameter switching memory circuit according to claim 1, wherein the external controller is a microprocessor that is independently located outside the optical sensor.

4. The function parameter switching memory circuit according to claim 3, wherein the microprocessor comprises an internal memory, or the microprocessor is electrically connected with an external memory, wherein the switched-and-set function parameter storage value is stored in one of the internal memory and the external memory.

5. The function parameter switching memory circuit according to claim 1, wherein if the physical switch signal is an abnormal physical switch signal, the external controller performs a switch signal filtering process to filter off the abnormal physical switch signal.

6. The function parameter switching memory circuit according to claim 1, wherein the peripheral device further comprises a power management device, which is electrically connected with the optical sensor and served as a power source, wherein the power management device is further electrically connected with the external controller, or the power management device is further electrically connected with the external controller and the virtual switch signal generator.

7. The function parameter switching memory circuit according to claim 6, wherein when the power management device is in a normal power state, the external controller generates and outputs the control command to the virtual switch signal generator according to the received physical switch signal, so that the optical sensor performs the function parameter switching process.

8. The function parameter switching memory circuit according to claim 6, wherein while the power management device is started or restarted after power interruption and the optical sensor is in a reset state, the external controller generates and outputs the control command to the virtual switch signal generator according to the memorized the switched-and-set function parameter storage value, so that the optical sensor performs the function parameter switching process.

9. The function parameter switching memory circuit according to claim 1, wherein the optical sensor issues a feedback monitoring signal to the external controller, and the external controller determines a content of the control command and a timing of generating and outputting the control command according to the feedback monitoring signal.

10. The function parameter switching memory circuit according to claim 9, wherein the feedback monitoring signal is a real function parameter of the optical sensor during operation and/or a function parameter switching notification interrupt signal of the optical sensor, wherein if the external controller performs a monitoring and comparing process and judges that the real function parameter and the switched-and-set function parameter storage value are different, the external controller regenerates and outputs the control command to the virtual switch signal generator according to the switched-and-set function parameter storage value, so that the optical sensor performs a function parameter calibration process.

11. The function parameter switching memory circuit according to claim 9, wherein the feedback monitoring signal is a ready signal of the optical sensor, wherein when the external controller receives the ready signal, the external controller generates and outputs the control command to the virtual switch signal generator according to one of the physical switch signal and the switched-and-set function parameter storage value, so that the optical sensor performs the function parameter switching process.

12. The function parameter switching memory circuit according to claim 11, wherein after the optical sensor is reset, the optical sensor generates and outputs the ready signal to the external controller.

13. The function parameter switching memory circuit according to claim 1, wherein if the external controller fails to receive the physical switch signal for a specified time period, the simulation control circuit is switched from a working mode to a low power consumption mode or a sleep mode.

14. The function parameter switching memory circuit according to claim 13, wherein when the simulation control circuit is in the low power consumption mode or the sleep mode, if the external controller receives the physical switch signal or the external controller performs a monitoring and comparing process and judges that a real function parameter of the optical sensor during operation and the switched-and-set function parameter storage value are different, the simulation control circuit is restored to the working mode.

15. The function parameter switching memory circuit according to claim 1, wherein the function parameter switching key is a key-type physical switch element or a touch-type switch element.

16. The function parameter switching memory circuit according to claim 1, wherein the peripheral device is a peripheral input device, and the peripheral input device includes a mouse device.

* * * * *